(12) United States Patent
Rotholtz et al.

(10) Patent No.: US 7,302,057 B2
(45) Date of Patent: Nov. 27, 2007

(54) METHOD AND PROCESS FOR TRANSMITTING VIDEO CONTENT

(75) Inventors: Ben Aaron Rotholtz, Yarrow Point, WA (US); Ji Shen, Simi Valley, CA (US); Gregory Joseph Conklin, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 686 days.

(21) Appl. No.: 10/372,025

(22) Filed: Feb. 21, 2003

(65) Prior Publication Data

US 2004/0153648 A1 Aug. 5, 2004

Related U.S. Application Data

(63) Continuation-in-part of application No. 10/355,970, filed on Jan. 31, 2003.

(51) Int. Cl.
*H04N 7/167* (2006.01)

(52) U.S. Cl. ............... 380/200; 380/242; 380/270; 380/33; 725/1; 725/50; 726/22; 726/27; 726/33; 713/194; 713/151; 713/181

(58) Field of Classification Search ........ 380/200–242, 380/270, 33, 255–273; 725/1–50; 726/22, 726/27–33
See application file for complete search history.

(56) References Cited

U.S. PATENT DOCUMENTS

| | | | | |
|---|---|---|---|---|
| 5,481,294 A | * | 1/1996 | Thomas et al. | 725/20 |
| 5,710,834 A | * | 1/1998 | Rhoads | 382/232 |
| 6,490,513 B1 | * | 12/2002 | Fish et al. | 701/35 |
| 6,675,383 B1 | * | 1/2004 | Wheeler et al. | 725/19 |
| 2002/0026635 A1 | * | 2/2002 | Wheeler et al. | 725/19 |
| 2003/0093530 A1 | * | 5/2003 | Syed | 709/226 |
| 2004/0088721 A1 | * | 5/2004 | Wheeler et al. | 725/9 |
| 2004/0091111 A1 | * | 5/2004 | Levy et al. | 380/202 |

* cited by examiner

*Primary Examiner*—Nasser Moazzami
*Assistant Examiner*—Chinwendu C. Okoronkwo
(74) *Attorney, Agent, or Firm*—Fish & Richardson P.C.

(57) ABSTRACT

Methods and apparatus, including computer program products, for transmitting content from a content collection site to a content monitoring site, including inserting a first digital signature into a first content segment collected by the content collection device, inserting a second digital signature, different form the first digital signature, into a second content segment collected by the content collection device sequentially after the first content segment, and transmitting the first content segment including the first digital signature and the second content segment including the second digital signature to the content monitoring site.

55 Claims, 5 Drawing Sheets

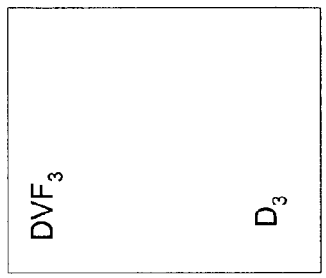
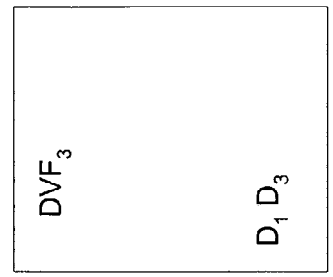
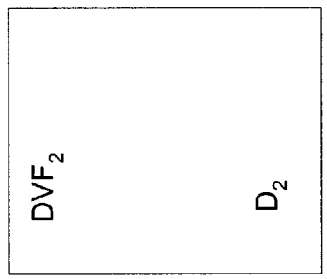
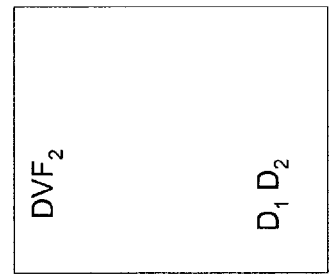
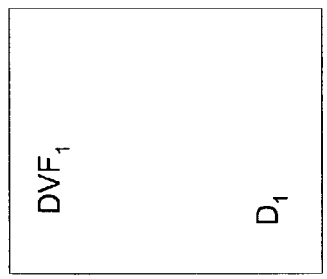
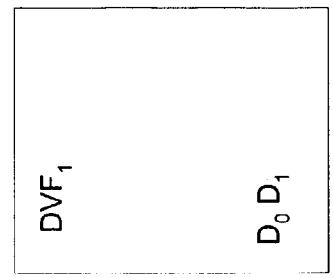
FIG. 1A
FIG. 1B

METHOD AND PROCESS FOR TRANSMITTING VIDEO CONTENT

RELATED APPLICATIONS

This application is a continuation-in-part application of U.S. patent application Ser. No. 10/355,970, Filed on Jan. 31, 2003, and entitled "A METHOD AND PROCESS FOR TRANSMITTING VIDEO CONTENT", incorporated herein by reference.

BACKGROUND

This application relates to a method and process for transmitting video content.

Video content such as a stream of video frames is typically produced by surveillance video cameras that capture images of particular locations such as entrances to bank vaults, museum halls that contain priceless artifacts, or other facilities associated with valuable merchandise. Typically the stream of video frames is transmitted to a security station located at the same facility holding the valuable merchandise so that security personnel can monitor the merchandise to prevent criminal activities. In some arrangements, the security personnel located in the security station differentiate video content from multiple video cameras by assigning a label (e.g., camera 1, camera 2, etc.) to each video camera being monitored. However, outside of the security station the assigned labels are typically not known and one video camera is not distinguishable from another video camera. Additionally, by accidentally or intentionally accessing (e.g., "tapping") into a pathway that delivers a video stream from a video camera to the security station, video content may be inserted and displayed to the security personnel that was not collected by the assigned video camera.

SUMMARY

According to an aspect of this invention, a method of transmitting content from a content collection site to a content monitoring site includes inserting a first digital signature into a first content segment collected by the content collection device, inserting a second digital signature, different from the first digital signature, into a second content segment collected by the content collection device sequentially after the first content segment, and transmitting the first content segment including the first digital signature and the second content segment including the second digital signature to the content monitoring site.

The above-described method may also be implemented as a process or as an apparatus, including computer program products.

One or more advantages may be provided from the invention.

By inserting a digital signature into digital video content on a frame-by-frame basis, the digital video is resistant to tampering and the probability of detecting video tampering increases. Also, by transmitting the digital signature across two independent pathways, one of which has restricted access, a monitoring site is provided with two copies of the digital signature that are identical if the transmitted digital video is unaltered. Further, by monitoring the digital signature inserted in each frame, security personnel can detect the position in the digital video where a frame has been added, deleted, or altered by comparing the two copies of the digital signature sent over the two pathways. Additionally, by including information unique to the video camera in the digital signature, the source of the video frames can be traced for authenticating the video content collected by that particular camera. By authenticating the video frames, the video content has increased trustworthiness and in some arrangements may be admissible in court as evidence.

Other features will be apparent from the following description, including the drawings, and the claims.

DESCRIPTION OF DRAWINGS

FIGS. 1A, 1B are diagrams pictorially depicting arrangement of digital signatures associated with digital video frames.

DETAILED DESCRIPTION

Figure 1:
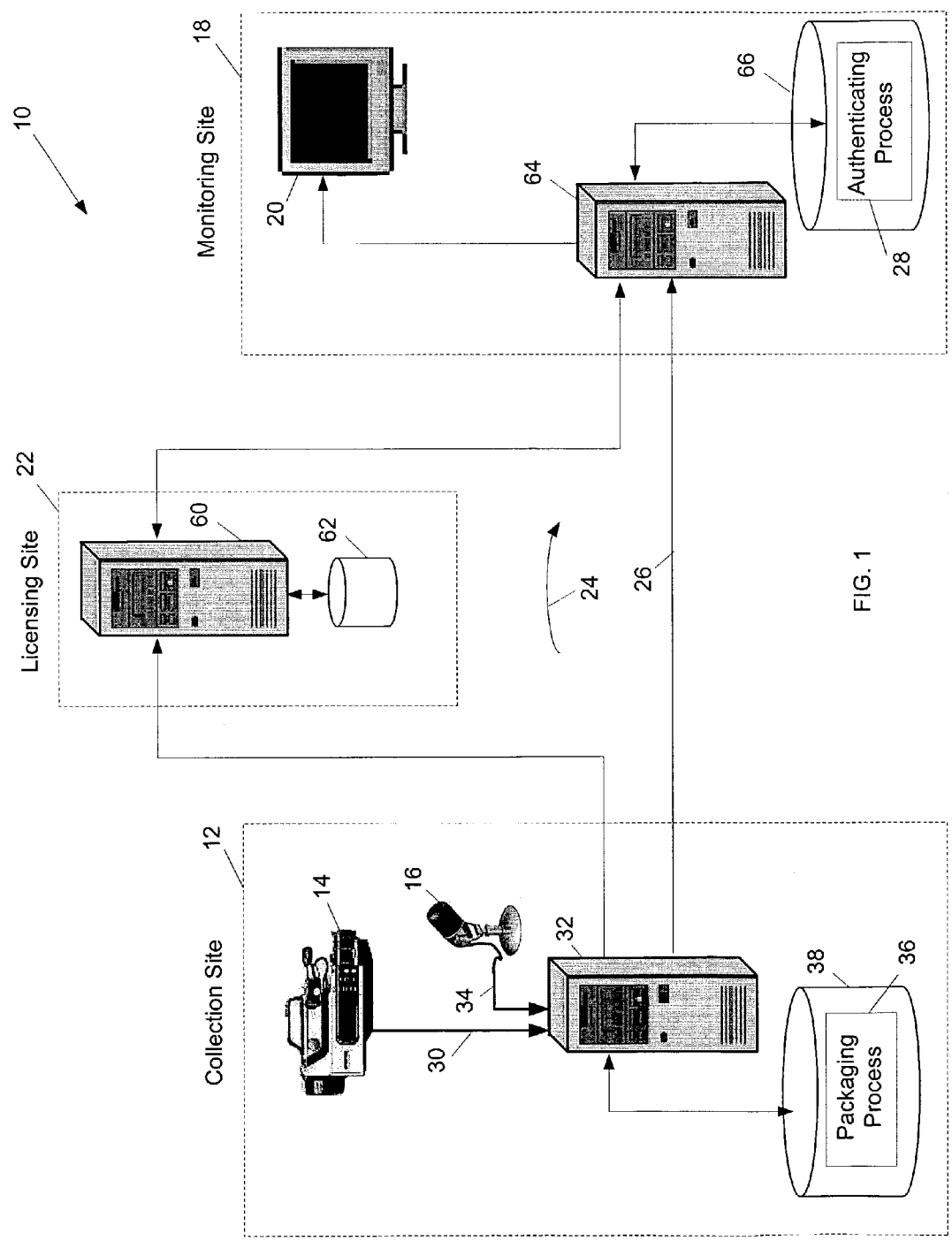
FIG. 1 is a block diagram depicting a security system.

Referring to FIG. 1, a security system 10 includes a collection site 12 where video content is captured with a video camera 14 (e.g., a camera that records video for playback on a television set or other viewing device) and audio content may be captured with a microphone 16 for tamper-resistant transmission to a monitoring site 18 (e.g., a security station, or other content monitoring site) that displays the transmitted video content on a monitor 20 and plays the audio content through one or more speakers (not shown) that may be included in the monitor. However, in some arrangements, sensors or other content collection devices may be used individually or in combination at the collection site 12 to collect other types of content such as temperature, moisture, heat, motion, or other similar content. Prior to transmitting the video content from the collection site 12 to the monitoring site 18, the video content is digitally signed. Digitally signing the video content is similar to signing a document with a handwritten signature. By digitally signing the video content with a digital signature the source (i.e., video camera 18) can be determined and not later repudiated. Also, by inserting a digital signature into the video content, the digital signature is received at the monitoring site 18 for authenticating the video content. By authenticating the video content received at the monitoring station 18, security personnel or other parties viewing the content on the monitor 20 are assured that the video content was not accidentally or intentionally tampered with or digitally altered prior to reception at the monitoring site 18. The security personnel may also be assured that the video content was captured by the video camera 14 located at the collection site 12.

To authenticate the video content transmitted from collection site 12 to the monitoring site 18, the monitoring site may retrieve a copy of the digital signature stored at a licensing site 22. The licensing site provides a secure depository for the stored digital signatures and may be located remotely or near the content collection site 12 or the monitoring site 18. The licensing site 22 receives the copy of the digital signature from the collection site 12 for storing and to provide an independent transmission path 24 for the digital signature from the collection site to the monitoring site 18 that is separate from a transmission path 26 that carries the digital signature inserted in the video content. In some arrangements the transmission paths include individually or in combination hardwire connections (e.g., Ethernet line, cable line, etc.), wireless links (e.g., cellular links, satellite links, etc.), or other similar transmission paths. By providing two independent transmission paths 24, 26 from the collection site 12 to the monitoring site 18, an authenticating process 28 executed at the monitoring site compares the digital signature received from the licensing site 22 and the digital signature inserted into the video content that is received directly from the collection site. By comparing the both digital signatures that are received over the two independent paths 24, 26, the authenticating process 28 can determine if the video content has been compromised by detecting additional video content, deleted video content, or altered video content. If the authenticating process 28 detects that the two independently transmitted digital signatures do not match, the authentication process 28 alerts security personnel to the mismatch and the potential altering of the video content transmitted from the collection site 12. While security system 10 includes two independent paths 24, 26, in some arrangements more than two independent paths are included in the security system. By including more paths, digital signatures and digital video frames can be distributed and transmitted across multiple paths to increase authenticating complexity and transmission speed of the security system 10.

As the video camera 14 collects video content in the collection site 12, the video camera transmits a stream of video content segments (e.g., video frames) over a cable 30 to a computer system 32. Similarly the microphone 16 located at the collection site 12 transmits audio content collected at the collection site over an audio cable 34 to the computer system 32. Additionally, sensors or other content collection devices that may be used at the collection site 12 group collected content (e.g., temperature, moisture, heat, motion, or other similar content) into content segments and transmit the content segments to the computer system 32. Once the video frames, which typically are included in an analog signal, are received by the computer system 32, the video frames are digitized into frames of digital video content. Similarly the audio content may be digitized by the computer system 32 into a series of digital audio samples or other similar digital segments. However, in some arrangements the digitizing may occur elsewhere, for example, the video camera 14 may include analog-to-digital (A/D) circuitry, such as is present in some digital video cameras that digitizes the video and audio content prior to transmitting to the computer system 32.

Once the stream of digital video frames and digital audio samples reside in the memory (not shown) of the computer system 32, a packaging process 36, which is stored on a storage device 38 (e.g., a hard drive, CD-ROM, etc.) of the computer system, is executed to insert a digital signature into each of the digital video frames. In some arrangements the packaging process 36 inserts a digital signature into the digital audio samples or inserts a digital signature into a combination of the digital audio samples and the digital video frames. However, prior to inserting the digital signature into the digital video frames, the packaging process 36 may produce the digital signature. Also, in some arrangements the packaging process 36 may be stored and executed on the video camera 14, microphone 16, or other similar sensor or content collection device to achieve additional security. Additional security is achieved if this process executes on a CPU that resides in the video camera 14 or the microphone/sensor 16.

In one example the digital signature may be produced to include two pieces of information. The first piece of information includes data that is unique to the particular video camera 14 that collected the video content. By including this data in the digital signature, the authenticating process 28 can extract the data and determine which exact camera captured the video content in each digital video frame. The second piece of information includes data that is unique to each of the digital video frames. By including this data in the digital signature, the authenticating process 28 can differentiate each individual digital video frame. For example, in each frame of a series of digital video frames, a digital signature may be inserted that includes a number unique to that particular frame. So as the series of digital video frames progress, each number inserted into each frame is changed (e.g., incremented). After the frames are received at the monitoring site 18, the authenticating process 28 can check the numbers inserted into each frame and detect alternations in the sequence of received frames. For example, if one or more frames are accidentally or intentionally inserted in the series prior to reception at the monitoring site 18, authenticating process 28 detects the new frames due to an absence of inserted digital signatures. Also, if one or more frames are deleted prior to reception at the monitoring site 18, the authenticating process 28 can detect the deletions due to a numerical gap in the numbers inserted in each digital signature. So, by including both pieces of information, the authenticating process 28 can authenticate each digital video frame and identity of the particular video camera 14 that collected the video content in each frame.

Referring to FIG. 1A, an example of distribution of digital signatures with digital video frame data is pictorially depicted. In general, the digital signature is transmitted in a known correspondence with the digital video frame data, but it is not actually part of the video content. Digital frames $DVF_1$-$DVF_3$ have digital signatures $D_1$-$D_3$ embedded in their respective, corresponding frames $DVF_1$-$DVF_3$.

Additionally, as shown in FIG. 1B, in some arrangements by slightly increasing the latency in the security system 10, a digital signature can be wholly or partially distributed across one or more digital video frames prior to and after the transmission of the actual digital video frame referenced by the digital signature. Thus digital frames $DVF_1$-$DVF_3$ have portions of digital signatures $D_0D_1$ in $DVF_1$, portions of digital signatures $D_1D_2$ in $DVF_2$ and portions of digital signatures $D_2D_3$ in $DVF_3$. This process engenders a higher degree of authentication and tamper resistance since digital signatures are distributed. In a lossy digital streaming environment, distributed digital signatures may also be used to corroborate intentional or accidental tampering.

In some arrangements, the data associated with the video camera 14 is stored in the storage device 38 and is retrieved by the packing process 36 to produce a digital signature associated with the video camera. However, in some arrangements the data, or a portion of the data, is stored in memory included in the video camera 14. To collect the data stored on the video camera memory, the packaging process 36 retrieves the data from the video camera over the connecting cable 30. Typically the data associated with video camera 14 that is collected from the storage device 38, from the camera itself, or a combination of the two, is uniquely related to the video camera 14 in the particular collection site 12. For example, the data can include unique camera attributes such as the model number of the camera, the serial number of the camera, the manufacturer of the camera, the manufacturing date of the camera, or other similar attributes. After this data is collected, the packaging process 36 inserts the data or a portion of the data into each digital video frame that was digitized from video content collected from the video camera 14 and sent to the computer system 32. By inserting this data into each frame, the digital video frames can be transmitted to a remote site, such as the monitoring site 18, and the data can then be extracted by the authenticating process 28 to identity of the video camera 14 that captured the original video content. Thus, by inserting the data into each frame captured by the video camera, in a sense, a digital signature unique to the video camera is inserted into each digital video frame.

In some arrangements both or either of the two independent transmission paths 24, 26 securely transmit over the respective path(s); For example, the transmission path 24 securely transmits digital signatures while the transmission path 26 securely transmits digital video frames including respectively inserted digital signatures. To secure the transmissions, secure transmission lines may be dedicated to either transmission path 24, 26, the digital signatures may be encrypted, or by use of other similar securing techniques. For example, the digital signatures may be encrypted by asymmetric encryption, known as public-key cryptography. When using public-key cryptography a digital signature received at the monitoring site 18 from the collection site 12 includes a public key that is publicly accessible. However, the digital signature received at the monitoring site 18 from the licensing site 22 includes a private key that is accessible only by permission granted by the licensing site 22. After the public and private keys are received at the monitoring site 18, the keys together decrypt the encrypted digital signatures and digital video frames. Also, in some arrangements the digital signatures include 128 bit, 256 bit, or other bit lengths for each of the public and private keys.

Also in some arrangements, digital signatures are produced using, individually or in combination, strong cryptographic techniques that are tamper-proof, weaker cryptographic techniques that are tamper-resistant, or other similar cryptographic techniques. For example, a digital signature can be produced using a hash function, a cyclic redundancy check (CRC), one or more proprietary signing algorithms, or other similar cryptographic techniques. By employing one or more weaker cryptographic techniques, security strength may be reduced, but computation time to produce to the digital signatures is also reduced while providing tamper-resistant digital signatures.

By inserting a digital signature into each frame transmitted from the collection site 12 to the monitoring site 18, the authenticating process 28 determines the particular source of the video frames directly from the inserted data and not from an arbitrary label that may be assigned to the video camera 14 by personnel located at the monitoring site. Similarly, in some arrangements, the packaging process 36 is executed to prepare digital audio for transmission to remote sites. Data associated with the microphone 16 such as model number, serial number, manufacturer, or date of manufacture of the microphone is inserted into the digital audio samples by the packaging process 36 so that personnel at the remote site can extract this microphone profile data to identify the particular microphone that captured the audio content. Alternatively, in some arrangements other information, which may or may not include the data associated with the microphone 16 or the video camera 14, may be inserted into each digital audio samples or each digital video frame. For example, static environmental data collected by the video camera 14 can be included in a digital signature inserted into each frame.

Figure 2:
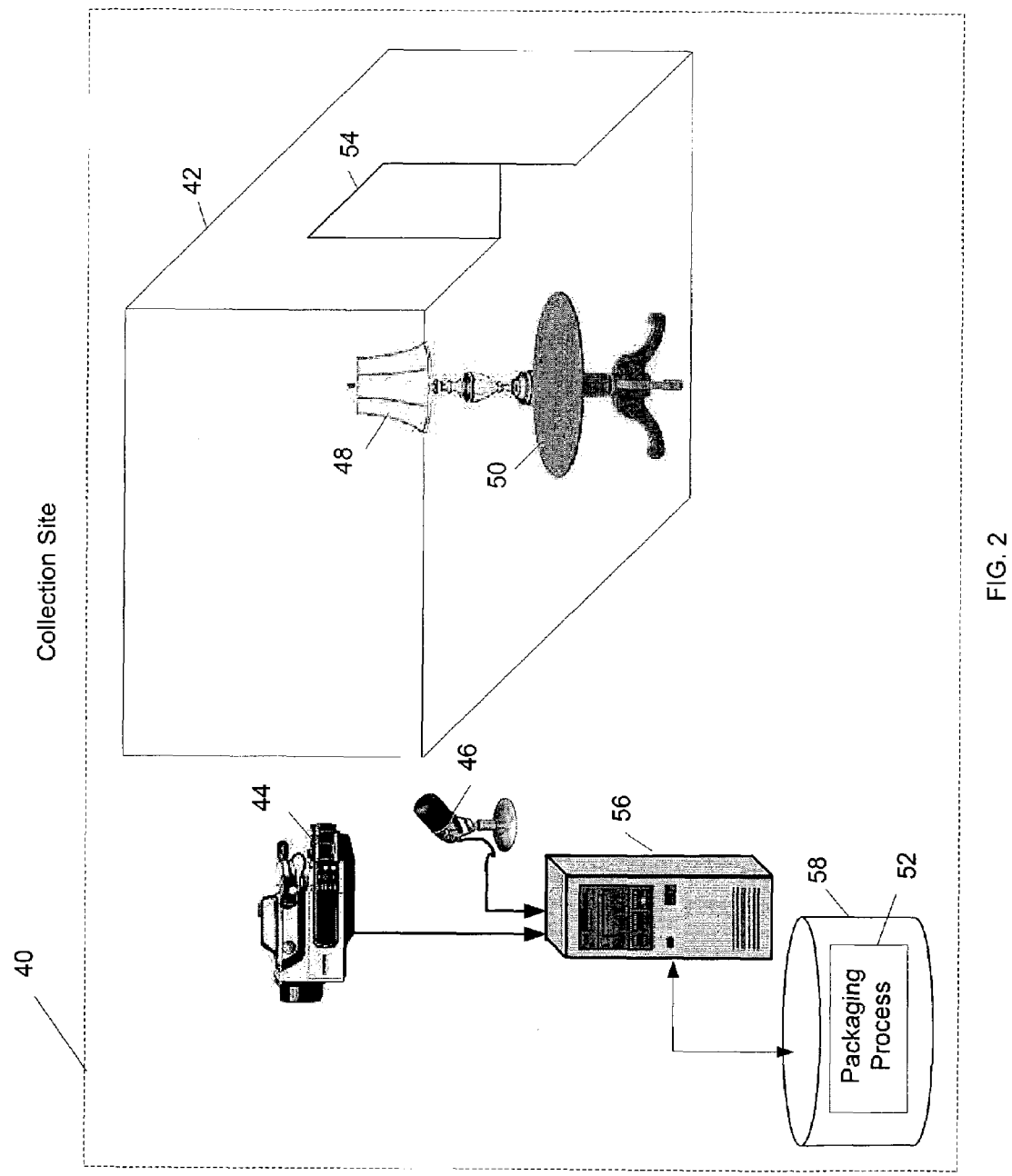
FIG. 2 is a block diagram depicting a collection site.

Referring to FIG. 2, a collection site 40 includes a portion of a room 42 that a video camera 44 is collecting video content and a microphone 46 is collecting audio content. In this particular example, the video camera 44 and the microphone 46 are held in fixed positions such that the image collected by the video camera remains unchanged so long as the objects (e.g., a lamp 48 and a table 50) included in the room do not change position or a person or other new object does not enter the video camera's field of view. Similarly since the microphone is held in a fixed position, the ambient background noise of the room 42 remains unchanged so long as the room's noise level does not rise or fall due to a new noise source that may be present in the room or a source that leaves the room.

Since the image and/or background noise of the room 42 does not change over time, unless a new noise source or image source appears in the room, the unchanging image and/or background noise can be used as reference data in a digital signature. For example, in one arrangement, a packaging process 52 can assign a numerical value to each individual pixel included in the room's image based on the strength of each pixel image. These numerical values are then averaged to provide an average pixel value that remains unchanged as long as the image of the room is unchanged. The one average pixel value is included in the digital signature of each digital video frame based on the video content provided by the video camera 44. Thus, the same average pixel value is included in each digital video frame unless another image source enters the room 42. For example, if a person enters through a door 54 in the room 42, the individual pixel values associated with the newly entered person will change. Thus, the average pixel value for the room 42 changes and is transmitted from the collection site 40. This average pixel value change is used to alert security personnel at the monitoring site 18 (shown in FIG. 1) that something has occurred in the room, i.e., a person has entered the room 42. Similarly, in some arrangements the packaging process 52 calculates an average audio background noise of the room 42 based on the ambient background noise collected by the microphone 46 and includes an average noise value in each digital signature. So long as the ambient noise level of the room 42 remains unchanged, the average noise value remains constant. However, if a person enters the room 42 through the door 54, the footsteps of the entering person cause the ambient noise level of the room to increase and correspondingly the calculated average noise value increases. The change in the average noise value can similarly be used to alert security personnel that a person has entered the room 42. In some arrangements the average noise value meets or exceeds a predetermined average noise threshold to initiate an alert to the security personnel.

Similar to the collection site shown in FIG. 1, a computer system 56 executes the packaging process 52 and stores the packaging process on a storage device 58 (e.g., a hard drive, CD-ROM, etc.). Similar to the packaging process 36 (shown in FIG. 1), the packaging process 52 inserts a digital signature into each digital video frame transmitted to a remote site such as the monitoring site 18 (shown in FIG. 1).

Returning to FIG. 1, after the packaging process 36 inserts a digital signature into each digital video frame based on the attributes of the video camera 14 and/or the video content captured by the video camera, the digital video frames are stored on the storage device 38 for accessing at a later time. However, in some arrangements the computer system 32 streams the digital video frames with the inserted digital signatures directly to the monitoring site 18 for viewing or further processing. Along with inserting a digital signature into each digital video frame, the computer system 32 also sends a copy of each digital signature to the licensing site 22. The licensing site 22 includes a computer system 60 that receives the copies of the digital signature from the computer system 32 and stores the received digital signatures on a storage device 62 (e.g., hard drive, CD-ROM, etc.). By storing a copy of the digital signatures at the licensing site 22, two copies of digital signatures can be received over the two separate pathways 24, 26 at the monitoring site 18. After both digital signature copies are received, the authenticating process 28 compares the digital signature inserted into the digital video frames, on a frame-by-frame basis, to the corresponding digital signature received from the licensing site 22. By comparing the two copies of the digital signatures, the video content included in a particular digital video frame is authenticated if the two respective digital signatures match. However, if the two digital signatures do not match, the authenticating process 28 alerts the security personnel at the monitoring site 18 to the potential altering of the associated digital video frame.

For example, after a digital signature is inserted into a series of digital video frames at the collection site 12, and the digital video frames are stored on the storage device 38, a computer system 64 located at the monitoring site 18 can access and retrieve the digital video frames for viewing. However, in order to confirm that the retrieved video frames were actually collected by the video camera 14, the digital video frames are authenticated by the authenticating process 28 at the monitoring site 18. To authenticate each digital video frame retrieved from the collection site 12, the computer system 64 retrieves the authenticating process, which is stored on a storage device 66 (e.g., a hard drive, CD-ROM, etc) for execution. By executing the authenticating process 28, the digital signature inserted into each digital video frame is compared to the copy of the digital signature received from the licensing site. By comparing the copies of the digital signature, the authenticating process 28 determines if one or more of the retrieved digital video frames do not contain a digital signature or if the inserted digital signature contained in one or more frames does not match the corresponding digital signature stored at the licensing site 22. For example, if one or more digital video frames that do not contain the appropriate digital signature are inserted into a series of video frames at the collection site 12 or between the collection site and the monitoring site 18, the authenticating process 28 detects the insertion by checking each digital video frame for the appropriate digital signature that is provided from the licensing site 22. Also, if one or more digital video frames are removed from the series of frames either at the collection site 12 or between the collection site and the monitoring site 18, the authenticating process 28 detects the absence of the one or more appropriate digital signatures that were inserted into the series of digital video frames. So, by comparing the digital signatures inserted into the digital video frames with the copy of the digital signatures retrieved from the licensing site 22 security personnel located at the monitoring site 18 are alerted to any accidental or intentional alterations of the digital video frames sent from the collection site 12.

Along with detecting alterations of the digital video frames, the authenticating process 28 may also use the digital signature inserted in each digital video frame to identify the particular video camera 14 source of the video frames. For example, the authenticating process 28 retrieves the data included in the digital signature to determine the source of the video frames. As previously mentioned, data included in the digital signature may include attributes of the video camera 14 that captured the video content in a particular digital video frame. In some arrangements these video camera attributes include the model number of the video camera, the serial number of the video camera, the manufacturer of the video camera, manufacture date of the video camera, or other similar attributes that provide the authenticating process 28 with unique information associated with the video camera 14 that collected the content of the digital video frame. By extracting this data from the digital signature, the authenticating process 28 uses the data to identify the video camera 14 to security personnel located at the monitoring site 18. Besides providing the video camera attributes to the security personnel, in some arrangements the authenticating process 28 checks the attributes for accuracy. For example, the authenticating process 28 uses the attribute data extracted from the digital signature to access a look-up table stored on the storage device 28 to validate that the attribute data is accurate and has not been altered. By checking the attribute data inserted in the digital signatures, the authenticating process 28 can validate the source of the video content in the digital video frames as the frames are received by the computer system 64 or at later time after the digital video frames are stored on and retrieved from the storage device 66.

In some arrangements to retrieve a copy of the digital signature stored at the licensing site 22, the computer system 64 located at the monitoring site 18 initiates a request for a particular digital signature stored at the licensing site. For example, the request sent from the computer system 64 at the monitoring site 18 to the computer system 60 at the licensing site 22 includes information (e.g., time and date of video content collection, particular collection site, etc.) to identify the particular digital signature of interest. Also, the request may include a username, password, and/or other information such as a global unique identifier (GUID) so that access to the digital signatures stored at the licensing site 22 is restricted to a particular group (e.g., security personnel located at the monitoring site 18). Additionally, by restricting access and granting permission to a selected group, the digital signatures stored at the licensing site 22 protect video content from being broadcast to individuals and entities that may accidentally or intentionally view or alter the video content collected at the collection site 12. For example, the authenticating process 28 could prevent viewing of video content that was not appropriately paired with a corresponding digital signature received from the licensing site 22.

As shown in FIG. 1, the computer system 32 is used to collect video content from the video camera 14, convert the video content into digital video frames, transfer the digital video frames to the monitoring site 18, etc. However, in some arrangements the functions performed by the computer system 32 may be performed by the video camera 14. By performing the functions executed by the computer system 32 with the video camera 14, the video content captured by the video camera is be digitized and transferred relatively quickly to the monitoring site 18 without transferring the video content to the computer system 32 prior to transmission.

Figure 3:
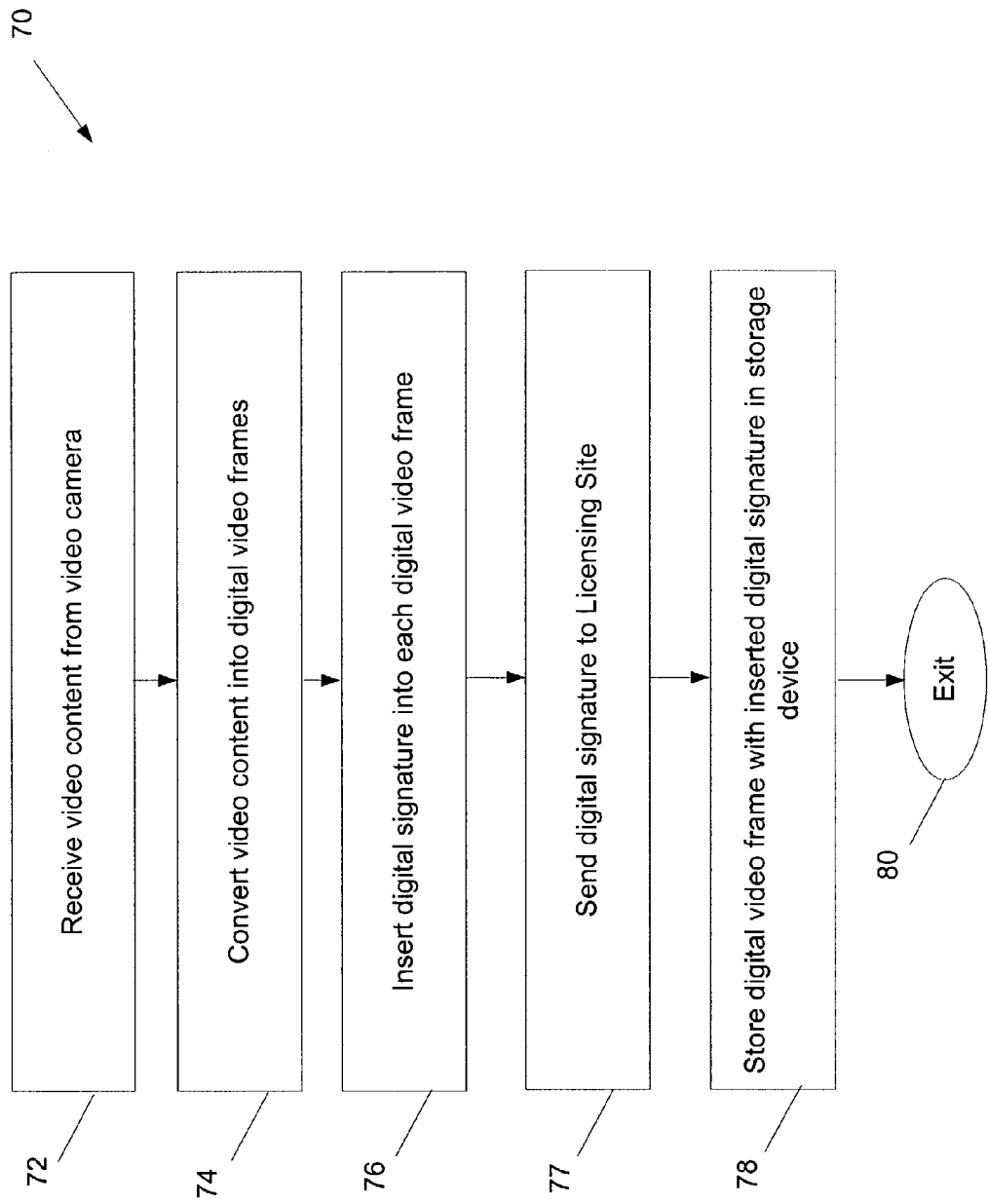
FIG. 3 is a flow chart of a packaging process.

Referring to FIG. 3, a packaging process 70 is shown. The packaging process 70 includes receiving (72) video content from a video camera, such as the video camera 14 shown in FIG. 1. After receiving (72) the video content from the video camera, the packaging process 70 converts (74) the video content into frames of digital video. However, in some arrangements the video camera converts the video content into the digital video frames. After converting (74) to frames of digital video, the packaging process 70 inserts (76) a digital signature into each digital video frame. In some arrangements, each inserted digital signature includes one or more numbers so that a sequence of numbers spans across the digital video frames. By including the sequence of numbers across the digital signatures of the digital video frames, changes in the series of digital video frames such as inserting additional frames or deleting particular frames accidentally or intentionally are detected. Also, in some arrangements the sequence of numbers can be uniformly distributed multiple times across different frames to increase tamper resistance. After the digital signature is inserted (76) into each digital video frame, the packaging process 70 sends (77) the digital signature to the licensing site 22 shown in FIG. 1. After the digital signature is sent (77) to the licensing site, the packaging process 70 stores (78) the digital video frames with the inserted digital signature in a storage device, such as the storage device 36 shown in FIG. 1. Once the digital video frames are stored (78) the packaging process 70 exits (80) and the stored digital video frames are accessed for viewing at a remote location such as the monitoring site 18 shown in FIG. 1.

Figure 4:
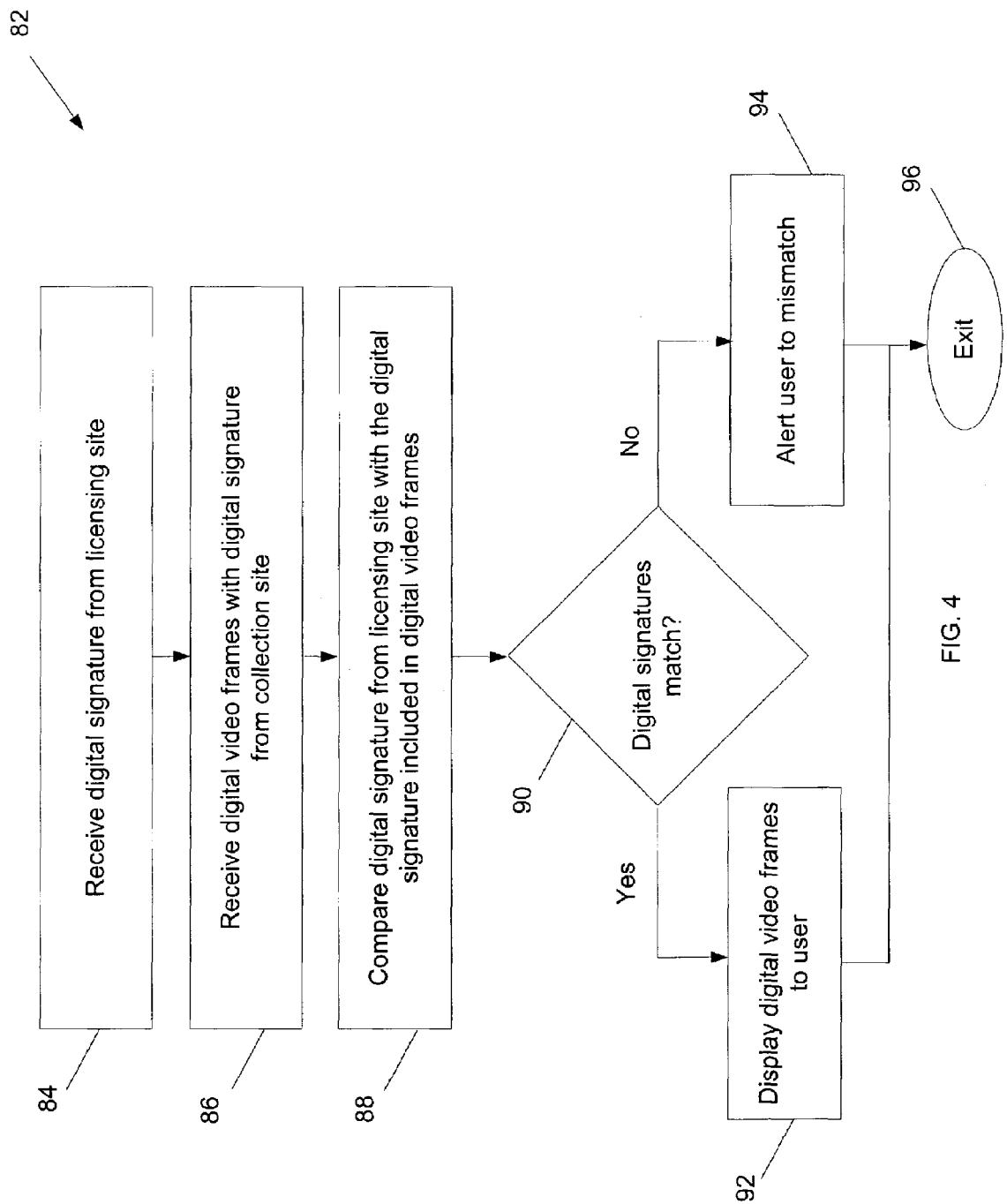
FIG. 4 is a flow chart of an authenticating process.

Referring to FIG. 4, an authenticating process 82 is shown. The authenticating process 82 starts by receiving (84) a digital signature from a licensing site such as the licensing site 22 shown in FIG. 1. In some arrangements the authenticating process 82 may request a particular digital signature from the licensing site by including information that identifies the digital signature of interest. Additionally, information may be included to gain access to the digital signature of interest. For example, the request may include a user name and password or unique machine identification (e.g., model number, serial number, IP address, etc.) that is used by the licensing site for granting permission to the requested digital signature. In some arrangements after the digital signature is received (84), the authenticating process 82 receives (86) digital video frames from a collection site such as the collection site 12 shown in FIG. 1. However in other arrangements, the digital video frames are received prior to receiving (84) the digital signature from the licensing site. As mentioned, each digital video frame is inserted with a digital signature at the collection site prior to reception by the authenticating process 82. In some arrangements, as shown in FIG. 1, the digital video frames are retrieved from the storage device 38 located at the collection site 12. Alternatively, the digital video frames may stream directly from the video camera 14 (also shown in FIG. 1). Once the digital video frames are received (86), the authenticating process 82 compares (88) the digital signature inserted in each digital video frame to the respective digital signature retrieved from the licensing site. After comparing (88), the authenticating process 82 determines (90) if the two respective digital signatures match for each digital video frame. If the respective pair of digital signatures match for each frame, the authenticating process 82 displays (92) the received digital video frames associated with the particular pair of digital signatures to a user, for example on the monitor 20 shown in FIG. 1, and then the authenticating process 82 exits 96. If the respective pairs of digital signatures do not match for each respective digital video frame, the authenticating process 82 alerts (94) the user to the one or more mismatches of digital signatures (e.g., a video frame has been accidentally or intentionally inserted, deleted, or altered, etc.) prior to exiting (96). Alternatively, in some arrangements, if a video frame is missing, perhaps due to a lossy environment, then rather than exiting (96) the authenticating process 82 may request the missing video frame be retransmitted from the collection site 12. Also, in some arrangements the authenticating process 82 may alert (94) other entities individually or in combination with the user for monitoring the quality of the video delivered, or for monitoring the overall security system, or other similar purposes.

The processes described herein can be implemented in digital electronic circuitry, or in computer hardware, firmware, software, or in combinations of them. The processes described herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods can be performed by one or more programmable processors executing a computer program to perform functions of the invention by operating on input data and generating output. The method can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The processes described herein can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The processes described herein can also be implemented in other electronic devices individually or in combination with a computer or computer system. For example, the processes can be implemented on mobile devices (e.g., cellular phones, personal digital assistants, etc.). In other arrangements the processes can be implemented on other electronic devices such as television and/or radio broadcasting systems, televisions, radio receivers, set-top boxes, video cassette recorders (VCR), digital versatile disc (DVD) players, other similar electronic device, individually or in combination, for packaging, delivering, and authenticating associated video content and/or audio content.

The invention has been described in terms of particular embodiments. Other embodiments are within the scope of the following claims. For example, the steps of the invention can be performed in a different order and still achieve desirable results.

What is claimed is:

1. A method of transmitting content from a content collection site to a content monitoring site, the method comprising:
    inserting a first digital signature into a first content segment collected by a content collection device;
    inserting a second digital signature, different from the first digital signature, into a second content segment collected by the content collection device sequentially after the first content segment;
    transmitting, over a first path, the first content segment including the first digital signature and the second content segment including the second digital signature to the content monitoring site; and
    transmitting the first digital signature and the second digital signature, absent the first and second content segments, to the content monitoring site over a second path, different from the first path.

2. The method of claim 1, wherein the first digital signature and the second digital signature are portions of a third digital signature.

3. The method of claim 1, wherein the content is selected from the group consisting of video content, audio content, temperature content, moisture content, heat content and motion content.

4. The method of claim 1, further comprising:
    at the content monitoring site receiving a first transmission, which includes the first digital signature, from the first path and a second transmission, which includes the first digital signature, from the second path; and
    comparing the first transmission to the second transmission.

5. The method of claim 4, wherein comparing the first transmission to the second transmission includes comparing the first digital signature included in the first transmission to the first digital signature included in the second transmission.

6. The method of claim 5, further comprising:
    alerting a user if the first digital signature included in the first transmission differs from the first digital signature included in the second transmission.

7. The method of claim 5, further comprising:
    displaying the first content segment included in the first transmission to a user if the first digital signature included in the first transmission matches the first digital signature included in the second transmission.

8. The method of claim 1, wherein the first digital signature includes an attribute of the content collection device.

9. The method of claim 1, wherein the first digital signature includes information relating to content collected by the content collection device.

10. The method of claim 1, further comprising:
    storing the first digital signature at the content collection site.

11. The method of claim 1, wherein the content collection device includes a video camera.

12. The method of claim 1, wherein the content collection device includes a sensor to sense environmental data.

13. The method of claim 1, wherein the first content segment includes a digital video frame.

14. The method of claim 1, wherein the first content segment includes a digital video frame converted from video content.

15. The method of claim 1, wherein the first content segment includes content collected from a sensor.

16. The method of claim 1, wherein the second path couples to a licensing site.

17. The method of claim 4, wherein the second path couples to a licensing site that provides access to the second transmission.

18. A process for transmitting content from a content collection site to a content monitoring site, the process comprising:
    a first insertion process for inserting a first digital signature into a first content segment collected by a content collection device;
    a second insertion process for inserting a second digital signature, different from the first digital signature, into a second content segment collected by the content collection device sequentially after the first content segment;
    a first transmission process for transmitting, over a first path, the first content segment including the first digital signature and the second content segment including the second digital signature to the content monitoring site; and
    a second transmission process for transmitting the first digital signature and the second digital signature, absent the first and second content segments, to the content monitoring site over a second path, different from the first path.

19. The process of claim 18, wherein the first digital signature and the second digital signature are portions of a third digital signature.

20. The process of claim 18, wherein the content is selected from the group consisting of video content, audio content, temperature content, moisture content, heat content and motion content.

21. The process of claim 18, further comprising:
    a reception process for receiving at the content monitoring site a first transmission, which includes the first digital signature, from the first path and a second transmission, which includes the first digital signature, from the second path; and
    a comparison process for comparing the first transmission to the second transmission.

22. The process of claim 21, wherein comparing the first transmission to the second transmission includes comparing the first digital signature included in the first transmission to the first digital signature included in the second transmission.

23. The process of claim 22, further comprising:
an alert process for alerting a user if the first digital signature included in the first transmission differs from the first digital signature included in the second transmission.

24. The process of claim 22 further comprising:
a display process for displaying the first content segment included in the first transmission to a user if the first digital signature included in the first transmission matches the first digital signature included in the second transmission.

25. The process of claim 18, wherein the first digital signature includes an attribute of the content collection device.

26. The process of claim 18, wherein the first digital signature includes information relating to content collected by the content collection device.

27. The process of claim 18, further comprising:
a storage process for storing the first digital signature at the content collection site.

28. The process of claim 18, wherein the content collection device includes a video camera.

29. The process of claim 18, wherein the content collection device includes a sensor.

30. The process of claim 18, wherein the first content segment includes a digital video frame.

31. The process of claim 18, wherein the first content segment includes a digital video frame converted from video content.

32. The process of claim 18, wherein the first content segment includes content collected from a sensor.

33. The process of claim 18, wherein the second path couples to a licensing site.

34. The process of claim 21 wherein the second path couples to a licensing site that provides access to the second transmission.

35. An article comprising a machine-readable medium which stores executable instructions to transmit content from a content collection site to a content monitoring site, the instructions causing a machine to:
insert a first digital signature into a first content segment collected by a content collection device;
insert a second digital signature, different from the first digital signature, into a second content segment collected by the content collection device sequentially after the first content segment;
transmit, over a first path, the first content segment including the first digital signature and the second content segment including the second digital signature to the content monitoring site; and
transmit the first digital signature and the second digital signature, absent the first and second content segments, to the content monitoring site over a second path, different from the first path.

36. The article of claim 35, wherein the first digital signature and the second digital signature are portions of a third digital signature.

37. The article of claim 35, wherein the content is selected from the group consisting of video content, audio content, temperature content, moisture content, heat content and motion content.

38. The article of claim 35, further comprising instructions to:
at the content monitoring site receive a first transmission, which includes the first digital signature, from the first path and a second transmission, which includes the first digital signature, from the second path; and
compare the first transmission to the second transmission.

39. The article of claim 38, wherein comparing the first transmission to the second transmission includes comparing the first digital signature included in the first transmission to the first digital signature included in the second transmission.

40. The article of claim 39, further comprising instructions to:
alert a user if the first digital signature included in the first transmission differs from the first digital signature included in the second transmission.

41. The article of claim 39, further comprising instructions to:
display the first content segment included in the first transmission to a user if the first digital signature included in the first transmission matches the first digital signature included in the second transmission.

42. The article of claim 35, wherein the first digital signature includes an attribute of the content collection device.

43. The article of claim 35, wherein the first digital signature includes an attribute of the content collection device.

44. The article of claim 35, further comprising instructions to:
store the first digital signature at the content collection site.

45. The article of claim 35, wherein the content collection device includes a video camera.

46. The article of claim 35, wherein the content collection device includes a sensor.

47. The article of claim 35, wherein the first content segment includes a digital video frame.

48. The article of claim 35, wherein the first content segment includes a digital video frame converted from video content.

49. The article of claim 35, wherein the first content segment includes content collected from a sensor.

50. The article of claim 35, wherein the second path couples to a licensing site.

51. The article of claim 38, wherein the second path couples to a licensing site that provides access to the second transmission.

52. A system for transmitting content from a content collection site to a content monitoring site, the system comprising:
a content collection device for collecting a first content segment and a second content segment, wherein the first content segment is inserted with a first digital signature and the second content segment is inserted with a second digital signature, different from the first digital signature; and
a computer system for transmitting, over a first path, the first content segment including the first digital signature and the second content segment including the second digital signature to the content monitoring site, and further transmits the first digital signature and the second digital signature, absent the first and second content segments, to the content monitoring site over a second path, different from the first path.

53. The system of claim 52, wherein the content is selected from the group consisting of audio content, temperature content, moisture content, heat content and motion content.

54. A method of a computer system transmitting content from a content collection site to a content monitoring site, the method comprises:

the computer system receiving a first content segment collected by a content collection device and a second content segment collected by the content collection device sequentially after the first content segment;

inserting a first digital signature into the first content segment;

inserting a second digital signature, different from the first digital signature, into the second content segment;

transmitting, over a first path, the first content segment including the first digital signature and the second content segment including the second digital signature to the content monitoring site; and transmitting the first digital signature and the second digital signature, absent the first and second content segments, to the content monitoring site over a second path, different from the first path.

55. The method of claim 54, wherein the content is selected from the group consisting of audio content, temperature content, moisture content, heat content and motion content.

* * * * *